(12) United States Patent
Kusachi et al.

(10) Patent No.: US 9,507,354 B2
(45) Date of Patent: Nov. 29, 2016

(54) HOT WATER SUPPLY APPARATUS AND CONTROL METHOD THEREOF

(71) Applicant: NORITZ CORPORATION, Hyogo (JP)

(72) Inventors: Rena Kusachi, Kobe (JP); Kenichi Nakayama, Akashi (JP); Hiroki Nabeshima, Akashi (JP); Yuki Maeshima, Kako (JP)

(73) Assignee: NORITZ CORPORATION, Hyogo (JP)

( * ) Notice: Subject to any disclaimer, the term of this patent is extended or adjusted under 35 U.S.C. 154(b) by 408 days.

(21) Appl. No.: 14/149,690

(22) Filed: Jan. 7, 2014

(65) Prior Publication Data

US 2014/0202680 A1    Jul. 24, 2014

(30) Foreign Application Priority Data

Jan. 18, 2013    (JP) .................. 2013-007243

(51) Int. Cl.
| | |
|---|---|
| *G05D 23/19* | (2006.01) |
| *F24H 1/14* | (2006.01) |
| *F24H 9/20* | (2006.01) |
| *F23N 1/08* | (2006.01) |
| *F23N 5/02* | (2006.01) |
| *F24D 19/10* | (2006.01) |

(52) U.S. Cl.
CPC ........... *G05D 23/1917* (2013.01); *F23N 1/082* (2013.01); *F23N 5/022* (2013.01); *F24H 1/145* (2013.01); *F24H 9/2035* (2013.01); *F23N 2025/18* (2013.01); *F23N 2025/19* (2013.01); *F24D 19/1063* (2013.01); *F24D 2220/044* (2013.01)

(58) Field of Classification Search
CPC ..... G06F 1/206; G06F 1/20; G05D 23/1917; F23N 1/082; F23N 5/022; F23N 2025/18; F23N 2025/19; F24H 1/145; F24H 9/2035; F24D 19/1063; F24D 2220/044
USPC .......................................... 700/300
See application file for complete search history.

(56) References Cited

U.S. PATENT DOCUMENTS

| | | | |
|---|---|---|---|
| 2009/0159017 A1* | 6/2009 | Tsuge ................. | F24D 19/1051 122/14.1 |
| 2012/0046801 A1* | 2/2012 | Mori ...................... | F24H 1/145 700/300 |
| 2013/0025546 A1* | 1/2013 | Okamoto ................. | F24H 8/00 122/14.21 |

FOREIGN PATENT DOCUMENTS

| | | |
|---|---|---|
| JP | 01-193553 A | 8/1989 |
| JP | 04-056221 B2 | 9/1992 |
| JP | H10141765 A * | 5/1998 |
| JP | 2007-322083 A | 12/2007 |
| JP | 2011-214761 A | 10/2011 |

* cited by examiner

*Primary Examiner* — Robert Fennema
*Assistant Examiner* — Jigneshkumar Patel
(74) *Attorney, Agent, or Firm* — Studebaker & Brackett PC (57) ABSTRACT

A conversion factor learning unit successively updates a temperature conversion factor by learning a performance ratio of an output heat quantity with respect to an input scale number corresponding to a requested heat quantity generation to a hot water supply apparatus. The temperature conversion factor learned by the conversion factor learning unit is reflected in arithmetic operation of an FF scale number by a feedforward control unit and arithmetic operation of the FB scale number by the feedback control unit. An integral control in the feedback control unit is preferably turned off.

20 Claims, 7 Drawing Sheets

HOT WATER SUPPLY APPARATUS AND CONTROL METHOD THEREOF

BACKGROUND OF THE INVENTION

Field of the Invention

The present invention relates to a hot water supply apparatus, and more particularly to a control of a tapping temperature from a hot water supply apparatus.

Description of the Background Art

Japanese Examined Patent Application Publication No. 4-56221, for example, discloses a hot water temperature control of a hot water supply apparatus in which a feedforward control based on a temperature difference between a set hot water temperature and an inflow water temperature is further combined in addition to a feedback control based on a deviation of a tapping temperature with respect to a set hot temperature so that the tapping temperature is controlled in accordance with the set hot water temperature.

Further, Japanese Patent Laying-Open No. 2011-214761 discloses, as one form of such a feedforward control, a control of prompt starting of a tapping temperature in an initial stage of starting combustion. Further, Japanese Patent Laying-Open No. 2007-322083 discloses a feedforward control of preventing continuation of a hot water tapping abnormal state.

SUMMARY OF THE INVENTION

Normally, a feedback control in a hot water temperature control of a hot water supply apparatus is executed by a combination of a proportional control and an integral control. Generally, a transitional temperature deviation generated in accordance with a disturbance or a change in set hot water temperature is compensated with the proportional control, and a steady deviation such as an offset in a fuel supply amount is compensated with the integral control.

However, in the integral control, when a control gain is set greater due to presence of a phase delay, hunting is likely to occur. On the other hand, when the control gain is small, a control responsiveness with respect to the set hot water temperature is lowered. As described above, adjustment of the integral control is difficult.

Japanese Examined Patent Application Publication No. 4-56221 discloses that a ratio between an output scale number given to a hot water supply apparatus and a performance scale number calculated from actual temperature performance is calculated, and that a correction coefficient in accordance with this ratio is applied to the feedforward control. However, Japanese Examined Patent Application Publication No. 4-56221 did not focus on the problem of the integral control described above, and there is a room for improvement in controllability of the feedback control and the feedforward control as a whole.

The present invention was achieve to solve the such a problem, and its object is to improve responsiveness and stability of a hot water temperature control of the hot water supply apparatus by making the combination of the feedforward control and the feedback control be highly functional.

According to one aspect of the present invention, a hot water apparatus includes a heat exchanger configured to heat passing water by means of a heat quantity generated by a heat source mechanism, a first temperature detector arranged on an upstream side of the heat exchanger, a second temperature detector arranged on a downstream side of the heat exchanger, a flow rate detector for detecting a passing flow rate through the heat exchanger, and a control apparatus. The control apparatus sets a requested heat quantity generation to the heat source mechanism for each predetermined control cycle based on an inflow water temperature detected by the first temperature detector, a tapping temperature detected by the second temperature detector, a set temperature of the tapping temperature, and a flow rate detected by the flow rate detector. The control apparatus includes a learning unit, a feedforward control unit, a feedback control unit, and an addition unit. The learning unit is configured to learn a conversion factor between a temperature and a heat quantity based on a performance ratio of an output heat quantity based on a temperature difference between the inflow water temperature and the tapping temperature and the flow rate with respect to the requested heat quantity generation to the heat source mechanism. The feedforward control unit is configured to calculate a first requested heat quantity generation based on a temperature difference between the set temperature and the inflow water temperature, the flow rate, and the conversion factor learned by the learning unit. The feedback control unit is configured to calculate a second requested heat quantity based on a temperature deviation of the tapping temperature with respect to the set temperature, the flow rate, a control gain, and the conversion factor learned by the learning unit. The addition unit is configured to set a requested heat quantity generation to the heat source mechanism by addition of the first requested heat quantity generation, and the second requested heat quantity generation.

According to another aspect of the present invention, a control method of a hot water supply apparatus provided with a heat exchanger configured to heat passing water by means of a heat quantity generated by a heat source mechanism includes the steps of detecting an inflow water temperature, detecting a tapping temperature, detecting a passing flow rate of the heat exchanger, learning a conversion factor between a temperature and a heat quantity, calculating a first requested heat quantity generation by a feedforward control, calculating a second requested heat quantity generation by a feedback control, and setting the requested heat quantity generation by addition of the first requested heat quantity generation and the second requested heat quantity generation. The inflow water temperature is detected based on an output of a first temperature detector arranged on an upstream side of the heat exchanger. The tapping temperature is detected based on an output of a second temperature detector arranged on a downstream side of the heat exchanger. A passing flow rate of the heat exchanger is detected based on an output of a flow rate detector. The conversion factor is learned based on a performance ratio of an output heat quantity based on a temperature difference between the inflow water temperature and the tapping temperature and the flow rate with respect to requested heat quantity generation to the heat source mechanism. The first requested heat quantity generation by the feedforward control is calculated based on a temperature difference between a set temperature of the tapping temperature and the inflow water temperature, the passing flow rate, and the learned conversion factor. The second requested heat quantity generation by the feedback control is calculated based on a temperature deviation of the tapping temperature with respect to the set temperature, the passing flow rate, a control gain, and the learned conversion factor.

The foregoing and other objects, features, aspects and advantages of the present invention will become more

DESCRIPTION OF THE PREFERRED EMBODIMENTS

Hereinafter, embodiments of the present invention will be described in detail with reference to the drawings.

First Embodiment

Figure 1:
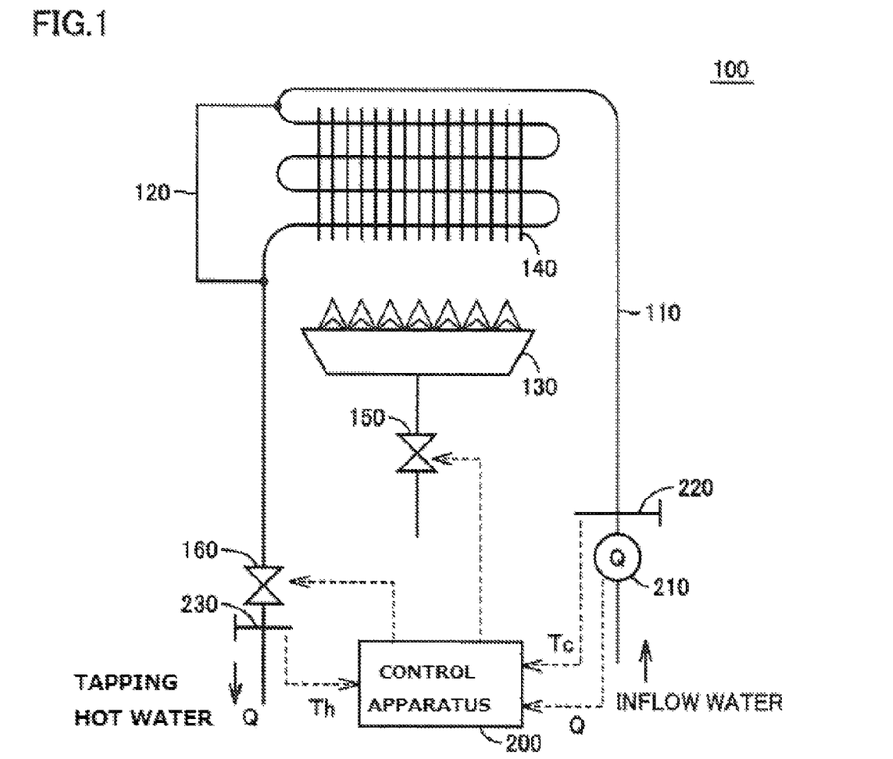
FIG. 1 schematically represents a configuration of a hot water supply apparatus according to an embodiment of the present invention.

FIG. 1 schematically represents a configuration of a hot water supply apparatus according to the embodiment of the present invention.

Referring to FIG. 1, a hot water supply apparatus 100 according to the embodiment of the present invention includes a hot water supply pipe 110, a bypass pipe 120, a gas burner 130, a heat exchanger 140, a gas proportional valve 150, a flow rate adjusting valve 160, and a control apparatus 200.

Hot water supply pipe 110 is configured to provide a connection from a water inlet to a hot water outlet. Flow rate adjusting valve 160 is interposed and connected to hot water supply pipe 110. Control apparatus 200 is able to control a tapping amount by adjusting a degree of opening of flow rate adjusting valve 160.

Gas burner 130 combusts a mixture of gas supplied from a gas pipe (not illustrated in the drawings) and air supplied from a combustion fan (not illustrated in the drawing) to generate a heat quantity. A pressure of gas supplied to gas burner 130 (in other words, a gas supply amount per unit time) is controlled in accordance with a degree of opening of gas proportional valve 150. The amount of air supplied from the combustion fan is controlled so that an air-fuel ratio in combustion at gas burner 130 is maintained to be constant.

The heat quantity generated by the combustion at gas burner 130 passes through heat exchanger 140 and is used for raising the temperature of water flowing through hot water supply pipe 110. Hot water supply apparatus 100 illustrated in FIG. 1 is configured to mix an output of heat exchanger 140 and an output of bypass pipe 120 for not allowing water to pass through heat exchanger 140 and tap hot water. It should be noted that arrangement of bypass pipe 120 may be omitted.

Hot water supply pipe 110 is provided with a flow rate sensor 210 and temperature sensors 220, 230. Flow rate sensor 210 detects a flow rate Q of hot water supply pipe 110. Temperature sensor 220 is provided on an upstream side of heat exchanger 140 to detect an inflow water temperature Tc. Temperature sensor 230 is provided on a downstream side of heat exchanger 140 to detect a tapping temperature Th. Detected flow rate Q, inflow water temperature Tc, and tapping temperature Th are inputted to control apparatus 200. In other words, flow rate sensor 210 corresponds to one example of a "flow rate detector", and temperature sensor 220 corresponds to one example of a "first temperature detector", and temperature sensor 230 corresponds to one example of a "second temperature detector".

Control apparatus 200 is configured with, for example, a microcomputer or the like and executes a hot water temperature control for controlling tapping temperature Th in accordance with a set hot water temperature Tr. Specifically, control apparatus 200 is configured to calculate a requested heat quantity generation, which is a heat quantity generated at gas burner 130 required for the hot water temperature control, and control a degree of opening of gas proportional valve 150 in accordance with the requested heat quantity generation. As described above, gas burner 130 is one example of a "heat source mechanism" capable of controlling a generated heat quantity by means of control apparatus 200.

When a generated heat quantity of gas burner 130 is changed, a heat quantity contributing to a change in water temperature through heat exchanger 140 increases, so that tapping temperature Th is changed.

Figure 2:
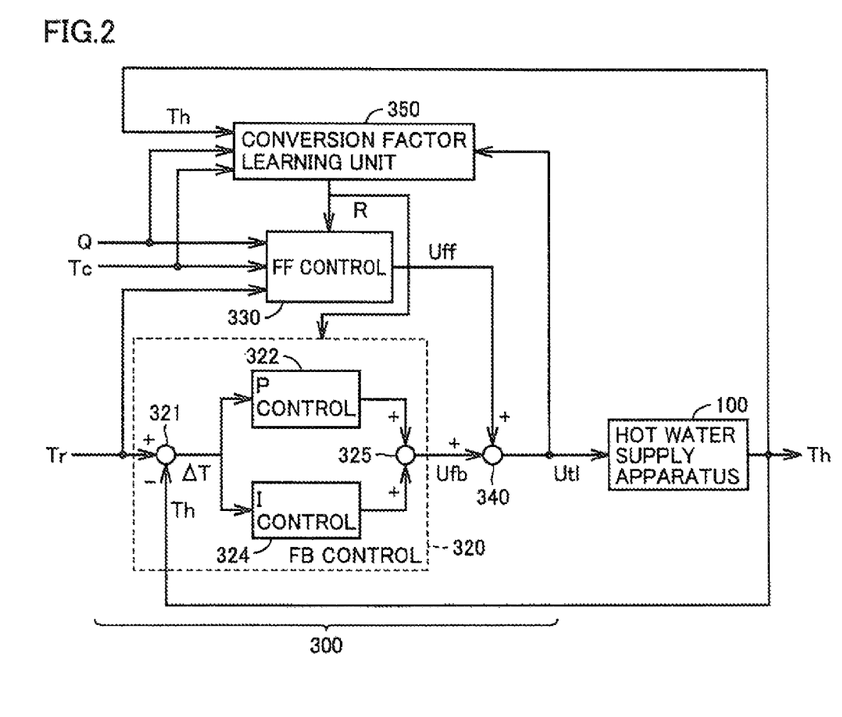
FIG. 2 is a functional block diagram for describing a hot water temperature control in the hot water supply apparatus according to the embodiment of the present invention.

FIG. 2 is a functional block diagram for describing a hot water temperature control in the hot water supply apparatus according to the embodiment of the present invention. For example, the function of each block shown in FIG. 2 is achieved by software processing executed by control apparatus 200.

Referring to FIG. 2, a hot water temperature control unit 300 sets a requested heat quantity generation Utl corresponding to an operation input to hot water supply apparatus 100. Generally, in a hot water supply apparatus, the requested heat quantity generation is calculated with a scale number as a unit. The "scale number=1" corresponds to a heat quantity required for raising the hot water temperature by 25° C. under a flow rate of Q=1 (L/min) Thus, requested heat quantity generation Utl is also referred to as "input scale number Utl" in the following.

An output of hot water supply apparatus 100 is tapping temperature Th detected by temperature sensor 230. Hot water temperature control unit 300 sets input scale number Utl so as to control tapping temperature Th, which is an output of hot water supply apparatus 100, in accordance with set hot water temperature Tr. In accordance with input scale number Utl, the fuel supply to gas burner 130, in other words, a heat quantity given to heat exchanger 140 from gas burner 130 is controlled.

Hot water temperature control unit 300 includes a feedback control unit 320, a feedforward control unit 330, an addition unit 340, and a conversion factor learning unit 350.

Conversion factor learning unit 350 learns a scale number conversion factor (in the following, also simply referred to as "conversion factor") R based on flow rate Q detected by flow rate sensor 210, an inflow water temperature Tc detected by temperature sensor 220, a tapping temperature Th detected by temperature sensor 230, and input scale number Utl to hot water supply apparatus 100.

Conversion factor R corresponds to a performance ratio Kr of an output heat quantity, which is expressed by a product of a rising temperature (Th–Tc) and flow rate Q, with respect to a requested heat quantity generation (here, it is input scale number Utl) to hot water supply apparatus 100. The Kr is defined by the following expression (1).

$$Kr = (Th - Tc) \times Q/Utl \qquad (1)$$

From the definition of the scale number described above, Kr is ideally 25. Therefore, a reference value of conversion factor R is also 25. However, in accordance with a deviation in pressure adjustment in gas proportional valve 150 (FIG. 1) and a state of the inflow water temperature, performance ratio Kr of the heat quantity, in other words, conversion factor R sometimes deviates from 25.

In the arithmetic operation of input scale number Utl, when the conversion factor R between the requested heat quantity (input scale number) and temperature are fixed to 25 (theoretical value), a deviation in conversion factor R in actual behavior is compensated by the feedback control or particularly by the integral control. However, as described above, since it is difficult to raise the integration gain for the phase delay which is inevitably present, it is relatively difficult to improve control responsiveness of the tapping temperature with respect to the set hot water temperature.

Thus, in the present embodiment, conversion factor R in actual behavior is learned by conversion factor learning unit 350, and learned conversion factor R is reflected in the feedback control and the feedforward control, so that replacement of the integral control is attempted.

Conversion factor learning unit 350 learns conversion factor R in accordance with the following expression (2) for each of certain control cycle Δt. For example, control cycle Δt is about 100 (ms). In the expression (2), R(n) is a learning value calculated based on a learning result in the control cycle for the present time ("n"th number), and R(n–1) is a learning value calculated in the previous control cycle ((n–1)th number).

$$R(n) = \frac{L}{L+1} \times R(n-1) + \frac{1}{L+1} \times \frac{(Th(n) - Tc(n)) \times Q(n)}{Utl(n-1)} \qquad (2)$$

In the expression (2), the "L" is a parameter for controlling a learning speed of conversion factor R(n). Parameter L is set variably in accordance with flow rate Q as shown in FIG. 3.

Figure 3:
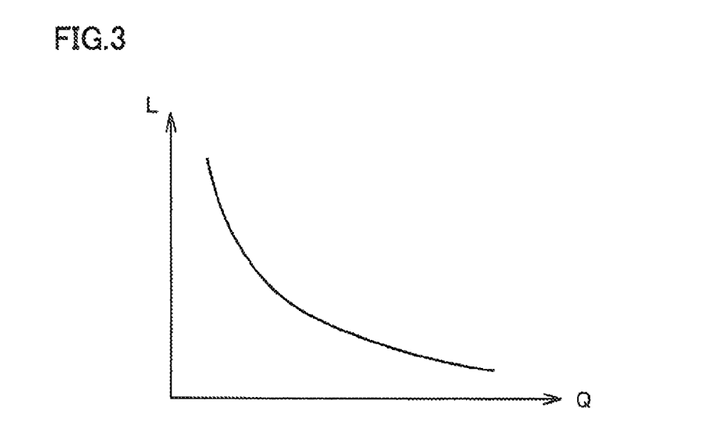
FIG. 3 is a characteristic diagram representing a relationship between a learning speed parameter of a conversion factor and a flow rate.

As shown in FIG. 3, parameter L is set to have a large value when the flow rate is low, and on the other hand, it is set to have a small value when the flow rate is high. This is because, in the case where flow rate Q is high, a behavior of the output heat quantity is stabled, so that a present performance ratio is promptly reflected to conversion factor R. On the other hand, in the case where flow rate Q is low, the output heat quantity easily changes, so that the speed of change in conversion factor R is lowered to stabilize learning. Based on the experiment in the actual site and simulation results, the characteristics of FIG. 3 can be set in advance. Further, in accordance with the characteristics of FIG. 3, functional expressions or tables for calculating parameter L from flow rate Q can be created in advance.

Feedforward control unit 330 calculates input scale number Uff by the feedforward control (hereinafter, also referred to as FF scale number Uff) based on a temperature difference between set hot water temperature Tr and inflow water temperature Tc, and based on flow rate Q. FF scale number Uff indicates a heat quantity (scale number) required for temperature rise in the inflow amount (flow rate Q) to hot water supply pipe 110 from inflow water temperature Tc to set hot water temperature Tr.

Feedback control unit 320 calculates an input scale number Ufb by the feedback control (hereinafter, also referred to as FB scale number Ufb) for resolving temperature deviation ΔT of tapping temperature Th with respect to set hot water temperature Tr.

Feedback control unit 320 includes a deviation calculating unit 321, a proportional control unit 322, an integral control unit 324, and an addition unit 325.

Deviation calculating unit 321 calculates temperature deviation ΔT of tapping temperature Th with respect to set hot water temperature Tr (ΔT=Tr–Th). Proportional control unit 322 calculates a product of proportional gain Kp and temperature deviation ΔT. Accordingly, the input scale number is calculated so as to resolve temperature deviation ΔT having occurred due to change in set hot water temperature Tr or flow rate Q, or generation of disturbance. In other words, the proportional control mainly secures transient control performance such as following capability to set hot water temperature Tr.

Integral control unit 324 calculates a product of an integrated value of temperature deviation ΔT and an integration gain Ki. Accordingly, the input scale number is calculated so as to mainly resolve steady temperature deviation ΔT in the state where set hot water temperature Tr and flow rate Q are in the stabled state. In other words, the integral control mainly secures the control performance in the steady state, such as convergence to set hot water temperature Tr. Further, conversion factor R learned by conversion factor learning unit 350 is also reflected in arithmetic operation of proportional control unit 322 and integral control unit 324.

Addition unit 325 calculates FB scale number Ufb by adding up the calculation result by proportional control unit 322 and the calculation result by integral control unit 324.

Further, addition unit 340 adds up FF scale number Uff and FB scale number Ufb, so that input scale number Utl indicating the requested heat quantity generation to hot water supply apparatus 100 is set. In other words, FF scale number Uff corresponds to the "first requested heat quantity generation", and FB scale number Ufb corresponds to the "second requested heat quantity generation".

Figure 4:
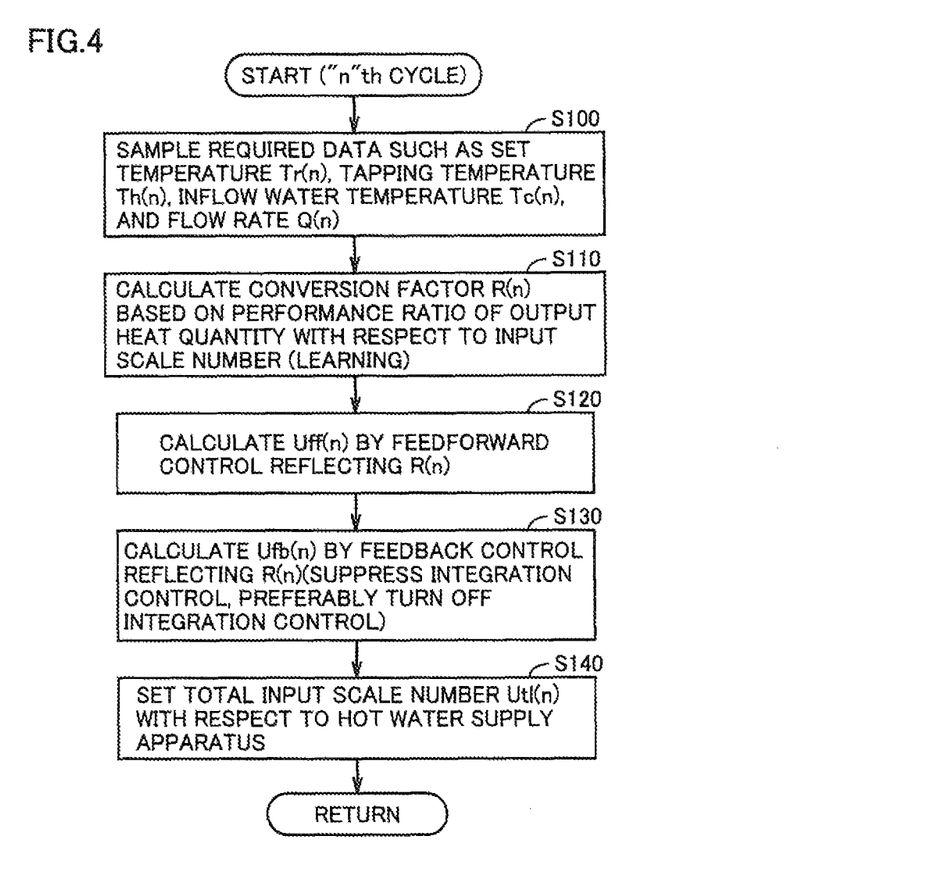
FIG. 4 is a flowchart for describing process procedures of the hot water temperature control in the hot water supply apparatus according to the embodiment of the present invention.

FIG. 4 is a flowchart representing control processing procedures of the hot water temperature control executed in the hot water supply apparatus according to the embodiment of the present invention. FIG. 4 shows the processing in the "n"th control cycle executed by the control system shown in FIG. 2. This processing is executed for each of predetermined control cycle Δt by control apparatus 200.

Referring to FIG. 4, in step S100, control apparatus 200 samples required data such as present set hot water temperature Tr(n), inflow water temperature Tc(n), tapping temperature Th(n), and flow rate Q(n) based on data in the control cycle for the present time, specifically, detected values provided by flow rate sensor 210 and temperature sensors 220, 230, and user instruction values.

Further, in step S110, control apparatus 200 calculates conversion factor R(n) in accordance with the expression (2) described above. R(n) is a present learning value of conversion factor R. Accordingly, in each control cycle, a performance ratio of the output heat quantity with respect to the input scale number is calculated, and the learning value is learned at a speed following parameter L (FIG. 3), so that R(n) is updated for each control cycle. In other words, by the processing of step S110, the function of conversion factor learning unit 350 in FIG. 2, in other words, the function of "learning unit" is achieved.

The learning of conversion factor R(n) is preferably executed in the state where the combustion state is stabled. Therefore, it is preferable to stop learning during adjustment of gas pressure or immediately after starting of combustion. Further, the initial value of conversion factor R can be set at 25 as a reference value following the definition of the scale number.

In step 120, control apparatus 200 executes the feedforward control reflecting conversion factor R(n) learned in step S110. Specifically, FF scale number Uff(n) is calculated in accordance with the expression (3) described below. In other words, the function of feedforward control unit 330 of FIG. 2 is achieved by the processing in step S120.

$$Uff(n) = \frac{Tr(n) - Tc(n)}{R(n)} \times Q(n) \quad (3)$$

Further, in step S130, control apparatus 200 executes the feedback control reflecting conversion factor R(n) learned in step S110. In the feedback control, the control arithmetic operation based on temperature deviation ΔT(n)(ΔT(n)=Tr(n)−Th(n)) in the control cycle for the present time is executed. Specifically, in accordance with the expression (4) described below, FB scale number Ufb(n) is calculated. In other words, by the processing in step S130, the function of feedback control unit 320 in FIG. 2 is achieved.

$$Ufb(n) = Kp \times \frac{\Delta T(n)}{R(n)} \times Q(n) + Ki \times \sum \left(\frac{\Delta T(n)}{R(n)}\right) \times Q(n) \quad (4)$$

In step S140, control apparatus 200 sets input scale number Utl(n) of hot water supply apparatus 100 by addition of the FF scale number and the FB scale number in accordance with the following expression (5).

$$Utl(n) = Uff(n) + Ufb(n) \quad (5)$$

As described above, in the hot water temperature control of the hot water supply apparatus according to the present embodiment, the learning value of conversion factor R is reflected in both of the feedforward control and the feedback control. On the other hand, the deviation from the theoretical value (25) of conversion factor R(n) occurs in the case where an error occurs in the output heat quantity by gas burner 130 with respect to the input scale number due to maladjustment of gas pressure, or in the case where loss occurs in the heat exchange at heat exchanger 140. Such error in conversion factor R causes steady temperature deviation ΔT. Therefore, in the conventional control system with conversion factor R fixed to 25, the error in conversion factor R is mainly compensated by the integral control.

On the other hand, in the present embodiment, since actual conversion factor R(n) is learned and reflected in the feedforward control, accuracy in the feedforward control is improved. Consequently, weight of the feedback control, particularly, the integral control for compensating the steady temperature deviation can be lowered. Preferably, the integral control which is difficult to adjust due to inevitable inclusion of the phase delay can be turned off to execute the feedback control only with the proportional control. In this case, the second term in the expression (4) (hereinafter, also referred to as "integration term Ui") can be deleted, and the calculation of FB scale number Ufb(n) can be performed only with the first term (hereinafter, also referred to as "proportional term Up").

Alternatively, lowering integration gain Ki from a normal value to prevent substantial contribution of the integral control is also included substantially in the action of turning off the integral control. For example, according to the gain setting in the normal feedback control system, in the steady state where set hot water temperature Tr and flow rate Q are maintained for a predetermined period, the relationship between the integration term and the proportional term is always |Ui|>|Up|. In the present embodiment, integration gain Ki is narrowed down, which may result in occurrence of a period with |Ui|≤|Up|.

Further, conversion factor R(n) is also reflected in the proportional control of the feedback control. Therefore, accuracy in the proportional control for compensating temperature deviation ΔTr(n) can be improved. Consequently, the transient control characteristics for securing the following capability to set hot water temperature Tr can also be improved.

As described above, in the hot water supply apparatus according to the present embodiment, since the feedforward control and the feedback control are executed while reflecting conversion factor R learned based on the performance ratio of the output heat quantity with respect to the requested heat quantity generation (input scale number) to hot water supply apparatus 100, the control accuracy can be improved. Particularly, even when the integral control, which is concerned to cause hunting when the control gain is raised, is turned off or suppressed, the steady temperature deviation can be suppressed by the feedforward control reflecting the conversion factor learning. Consequently, the responsiveness and the stability of the hot water temperature control of the hot water supply apparatus can be improved by making the combination of the feedforward control and the feedback control be highly functional.

Further, in the hot water supply apparatus according to the present embodiment, in the case where the learning value of conversion factor R significantly deviates from the theoretical value (in other words, 25), it is concerned that some abnormality occurs in hot water supply apparatus 100.

Figure 5:
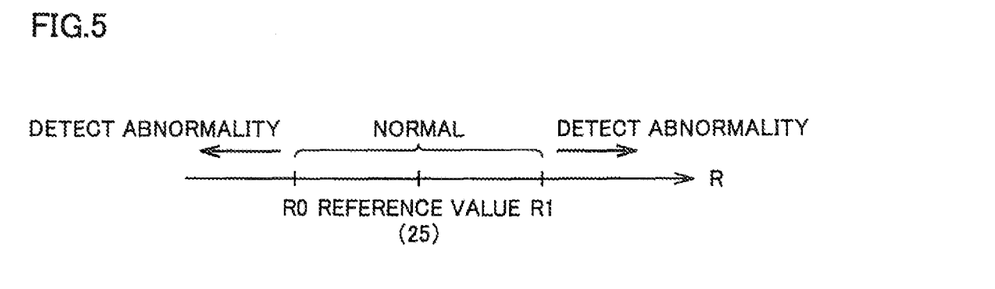
FIG. 5 is a conceptual diagram for describing an abnormality diagnosis based on a learning result of the conversion factor in the control apparatus according to the present embodiment.

Therefore, the learning value R(n) in the situation where the learning of the conversion factor is stable can be used to perform abnormality diagnosis as shown in FIG. 5.

Referring to FIG. 5, conversion factor learning unit 350 (FIG. 2) determines that "learning of the conversion factor is stable", for example, when the learning of the conversion factor is continued for a predetermined time period (for example, sixty seconds), and a variation in a predetermined time period for both of input scale number Utl and output heat quantity is less than or equal to a predetermined value (for example, when the variation ratio for ten seconds is within 3%).

When it is determined that learning of the conversion factor is stable, control apparatus 200 determines whether or not the present learning value (in other words, conversion factor R(n)) is within the normal range of R0 to R1 including the reference value of 25. Then, when R0≤R(n)≤R1 is provided, control apparatus 200 determines that hot water supply apparatus 100 is normally driven.

On the other hand, when R(n)<R0 or R(n)>R1 is provided, control apparatus 200 determines that abnormality has likely occurred in hot water supply apparatus 100 and provides information for prompting equipment check to a user.

For example, when R(n)>R1 is provided, in other words, conversion factor R is too high, it is in the state where actual output heat quantity is too large as compared to the input scale number. Therefore, there is a possibility that the adjustment of the gas supply pressure is deviated, and the gas supply pressure to gas burner 130 is too high with respect to the input scale number. Further, when R(n)<R0 is provided, it is in the state where actual output heat quantity is too small with respect to the input scale number. Therefore, there is a possibility that blocking due to adhesion of soot in heat exchanger 140 has occurred. Thus, when R(n) <R0 or R(n)>R1 is provided, it is preferable to add information on learning value R(n) of the conversion factor is in the state of being too large or too small and notify it to a user.

As described above, in the hot water supply apparatus according to the present embodiment, abnormality diagnosis can be performed together by using the learning result of conversion factor R for improving responsiveness and stability of the hot water temperature control.

Second Embodiment

In the second embodiment, the setting of conversion factor R in the control of promptly raising the tapping temperature in the initial stage of starting combustion (hereinafter, also referred to as "initial temperature-raising control") will be described.

Figure 6:
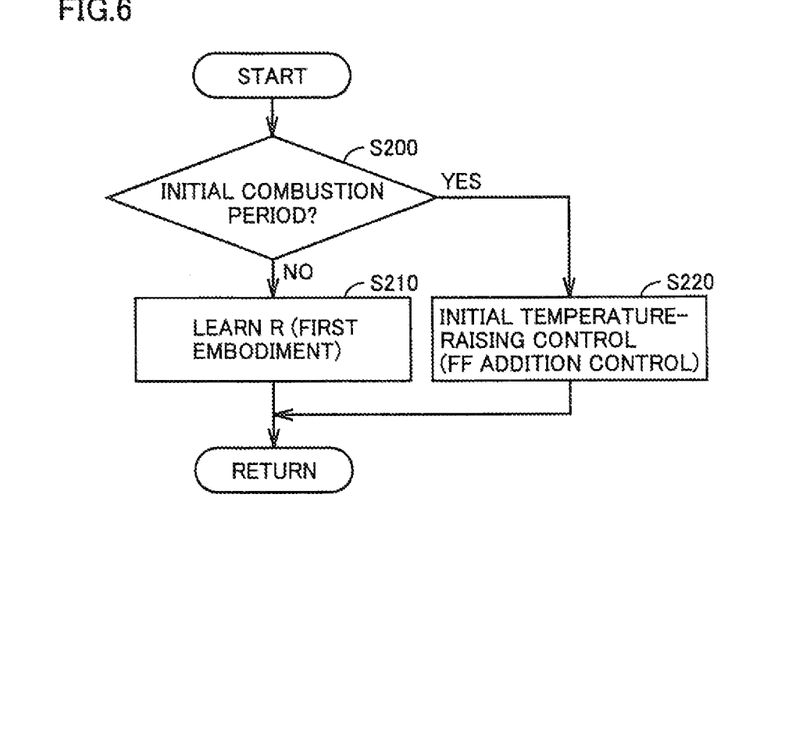
FIG. 6 is a flowchart for describing a method for setting the conversion factor in a temperature-raising apparatus according to the present embodiment.

FIG. 6 is a flowchart for describing the method for setting conversion factor R in the temperature-raising apparatus according to the present embodiment.

Referring to FIG. 6, in step S200, when combustion is started in hot water supply apparatus 100, control apparatus 200 determines whether or not it is in the initial combustion period. For example, in hot water supply apparatus 100, an initial combustion flag FLG indicating whether or not it is in the initial combustion period is introduced. Initial combustion flag FLG is turned on at the time of starting combustion. Then, when tapping temperature Th rises to vicinity of set hot water temperature Tr, initial combustion flag FLG is turned off. For example, when Th>Tr−α is satisfied (for example, α=3° C.), initial combustion flag FLG is turned off. As described above, initial combustion flag FLG, with the time of starting combustion as an origin, is on during a period where a shortage (Tr−Th) of tapping temperature Th with respect to set hot water temperature Tr becomes smaller than a predetermined threshold value α.

In the initial combustion period where the initial combustion flag is on (at the time of determination of YES in S200), control apparatus 200 allows the processing to proceed to step S220 and executes the initial temperature-raising control. On the other hand, control apparatus 200 allows the processing to proceed to step S210 when initial combustion flag FLG is off, in other words, after the initial combustion period is terminated (at the time of determination of NO in S200), and executes the hot water temperature control described in the first embodiment. In this stage, conversion factor R is set so as to successively learn a performance ratio of the output heat quantity with respect to the input scale number for each control cycle by means of conversion factor learning unit 350 shown in FIG. 2.

In the initial temperature-raising control, as shown in Japanese Patent Laying-Open No. 2011-214761, it is necessary to make an attempt to promptly raise the temperature by temporarily raising the input scale number by the feedforward control.

In the second embodiment, the control processing of using the arithmetic expression (expression (3)) in common with the feedforward control reflecting conversion factor R, as described in the first embodiment, to achieve the initial temperature-raising control will be described.

Figure 7:
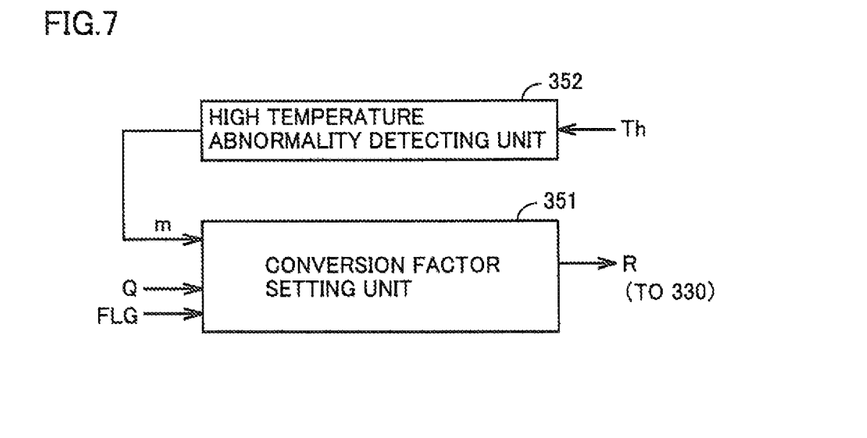
FIG. 7 is a functional block diagram for describing a configuration for setting the conversion factor in an initial temperature-raising control.

FIG. 7 is a functional block diagram for describing a configuration for setting conversion factor R in the initial temperature-raising control.

Referring to FIG. 7, in the initial temperature-raising control, conversion factor learning unit 350 shown in FIG. 2 is stopped, so that learning of conversion factor R is not executed. On the other hand, when initial combustion flag FLG is on, in other words, at the time of application of the initial temperature-raising control, conversion factor setting unit 351 operates to set conversion factor R. Conversion factor R set by conversion factor setting unit 351 is transmitted at least to feedforward control unit 330 FIG. 2), and reflected in the arithmetic operation of FF scale number Uff by expression (3). In other words, conversion factor setting unit 351 corresponds to the "initial setting unit".

According to the feedback control in the initial temperature-raising control, conversion factor R may be fixed to 25, or conversion factor R set by conversion factor setting unit 351 may be used in the arithmetic operation of FB scale number Ufb in accordance with expression (4). Further, in the initial temperature-raising control, the feedback control may be omitted, and executing only the feedforward control is possible.

Conversion factor setting unit 351 sets conversion factor R based at least on flow rate Q detected by flow rate sensor 210 (FIG. 1).

Figure 8:
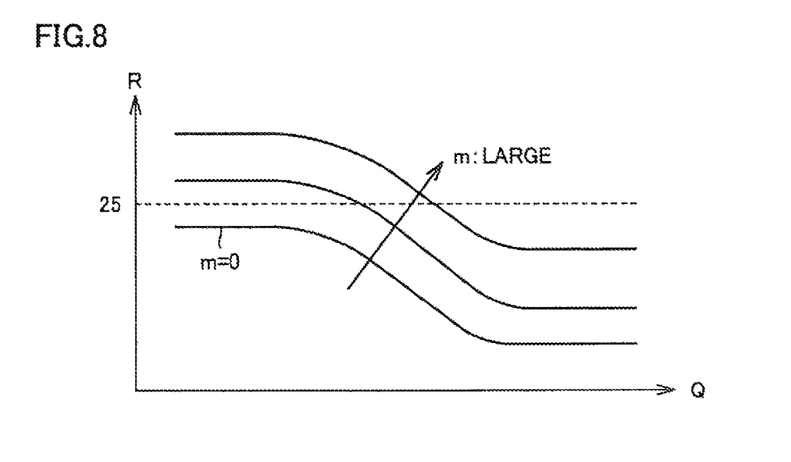
FIG. 8 is a characteristic diagram schematically representing a relationship between the conversion factor set by a conversion factor setting unit shown in FIG. 7 and a flow rate.

FIG. 8 is a characteristic diagram schematically representing the relationship between the conversion factor set by conversion factor setting unit 351 and the flow rate.

As shown in FIG. 8, conversion factor setting unit 351 sets conversion factor R in accordance with flow rate Q. When R<25 is set, FF number Uff becomes greater than the normal state (R=25). Therefore, the tapping temperature can be raised promptly by increasing the generated heat quantity to hot water supply apparatus 100.

In the region where flow rate Q is low, the residence time in heat exchanger 140 becomes long. Therefore, when FF scale number Uff is set to be too large, tapping temperature Th is likely to rise excessively. On the other hand, in the region where flow rate Q is high, such excessive high temperature is less likely to occur. Therefore, it is preferable to set FF scale number Uff to be high to direct prompt temperature rise. Thus, as shown in FIG. 8, conversion factor R in the initial temperature-raising control is set to be higher in the region where flow rate Q is low than the region where flow rate Q is high. Further, in an intermediate region, conversion factor R is set to be low in accordance with increase in flow rate Q.

As described above, by setting conversion factor R in the initial temperature-raising control in accordance with flow rate Q, excessive temperature rise can be avoided, and the tapping temperature can be raised promptly during the initial period after starting of combustion.

Referring back to FIG. 7, to avoid excessive rise in the hot water temperature during the initial temperature-raising control, conversion factor setting unit 351 can further reflect the number "m" of high-temperature detection set by a high temperature abnormality detecting unit 352 to set conversion factor R in the initial temperature-raising control.

When tapping temperature Th rises excessively, high temperature abnormality detecting unit 352 detects high temperature abnormality and increases the number "m" of high-temperature detection. For example, when Th>Tr+β (for example, β=10° C.) is satisfied, in other words, the excessive temperature of tapping temperature Th with respect to set hot water temperature Tr becomes greater than predetermined threshold value β, high temperature abnormality detecting unit 352 increases the number "m" of high-temperature detection by 1.

The high temperature abnormality occurs when the actual output heat quantity is excessively large as compared to the input scale number due to deviation in adjustment of the gas supply pressure. Thus, in the state where the high temperature abnormality occurs frequently, when FF scale number Uff is set to be larger than normal by the initial temperature-raising control, it may lead to excessive rise in the hot water temperature. When the amount of rise in temperature (Th−Tr) is large, high temperature abnormality detecting unit 352 may forcibly stop the combustion of hot water supply apparatus 100.

Referring back to FIG. 8, as compared to the case where the number "m" of high-temperature detection is equal to 0, conversion factor R is set to have a high value in accordance with increase of the number "m" of high-temperature detection with respect to same flow rate Q. Since this suppresses increase in the FF scale number of the initial temperature-raising control, excessive rise in tapping temperature Th during the initial temperature-raising control can be prevented.

For example, as shown in the example of FIG. 8, while R<25 is set throughout the whole flow rate region when m=0, the region set to be R>25, in other words, the region with lower FF scale number than normal occurs when the number "m" increases. As described above, by setting conversion factor R in the initial temperature raising control based on both of the number "m" of high-temperature detection and flow rate Q, the excessive rise in the hot water temperature during the initial temperature-raising control can be avoided more effectively.

As described above, the prompt rise in the tapping temperature can be attempted by basically setting conversion factor R to be small at the time of application of the initial temperature-raising control. Consequently, when tapping temperature Th rises up to (Tr−α) which is a determination value in step S200 (FIG. 6), the initial temperature-raising control is terminated along with termination of the initial combustion period. Then, learning of the conversion factor described in the first embodiment is started.

Figure 9:
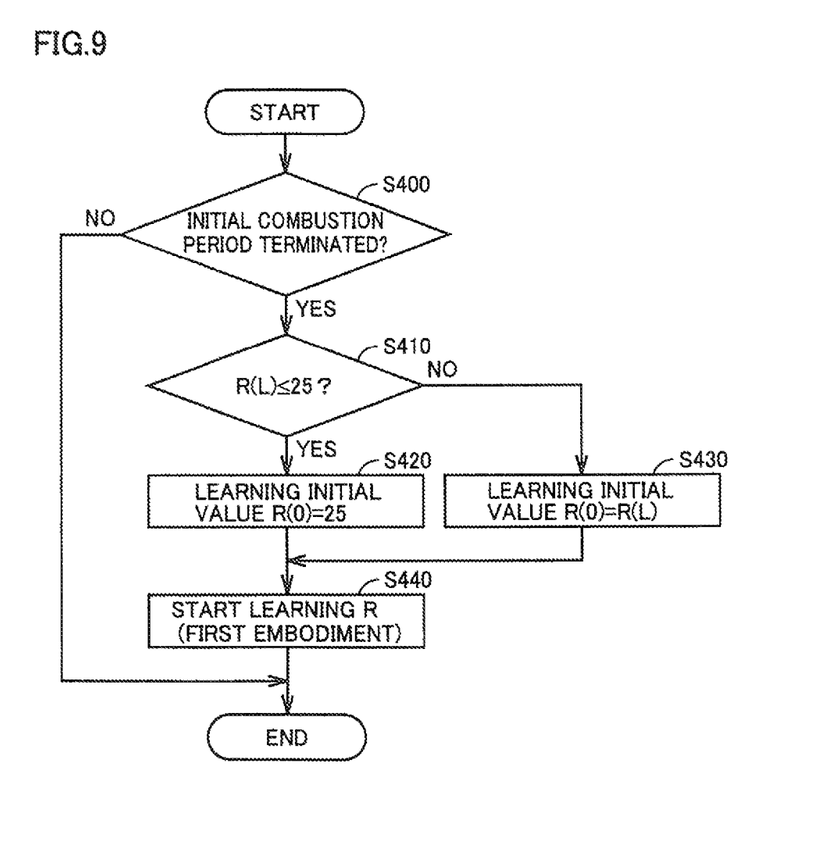
FIG. 9 is a flowchart for describing setting processing of a learning initial value of the conversion factor at the termination of an initial combustion period.

FIG. 9 represents a flowchart for describing the setting processing of the learning initial value of the conversion factor at the time of termination of the initial combustion period.

Referring to FIG. 9, in step S400, control apparatus 200 determines during execution of the initial temperature-raising control whether or not the initial combustion period has been terminated. It is determined "YES" in step S400 when Th>Tr−α is satisfied. When it is determined "YES" in step S400, initial combustion flag FLG is turned off.

When it is determined "NO" in step S400, the initial temperature-raising control is continued. Therefore, the processing of steps S410 to S440 is skipped.

When the initial combustion period is terminated (determination of "YES" in S400), control apparatus 200 allows the processing to proceed to step S410 and compares a present value of conversion factor R, in other words, a set value R(L) of the conversion factor at the time of termination of the initial combustion period with the value of 25 which is the reference value.

When R(L)≤25 (determination of "YES" in S410), control apparatus 200 sets learning initial value R(0) of conversion factor R to be 25 in step S420. In the state of R(L)≤25, the FF scale number is forcibly set to be higher than normal to prioritize the prompt rise in temperature. After the termination of the initial combustion period, it is necessary to weigh importance on controllability to set hot water temperature Tr. Therefore, it is preferable to set learning initial value R(0) so as to learn deviation from the reference value of 25.

On the other hand, when R(L)>25 (determination of "NO" in S410), control apparatus 200 allows the processing to proceed to step S430, and uses conversion factor R(L) used at the time of termination of the initial combustion period directly as learning initial value R(0). As described above, in the state of R(L)>25, the FF scale number is set lower than normal to prevent excessive rise in temperature. Therefore, at the time of termination of the initial temperature-raising control, when learning initial value R(0) is set to be 25, the FF scale number increases in a step-like manner. Therefore, the rapid rise in tapping temperature Th is concerned. Accordingly, consideration is made so as not to cause a change in conversion factor R by prioritizing occurrence of excessively high temperature.

When learning initial value R(0) is set in step S420 or S430, control apparatus 200 allows the processing to proceed to step S440, and starts learning of conversion factor R by means of conversion factor learning unit 350 shown in FIG. 2. Subsequently, conversion factor setting unit 351 stops its operation, and calculates FF scale number Uff and FB scale number Ufb for each control cycle in accordance with conversion factor R calculated by learning by means of conversion factor learning unit 350 as described in the first embodiment.

In such a manner, when conversion factor R during the initial temperature-raising control is set so as to prevent excessively high temperature, occurrence of the excessively high temperature can be prevented at the time of transition from the initial temperature-raising control to the normal hot water temperature control based on the learning of the conversion factor.

Figure 10:
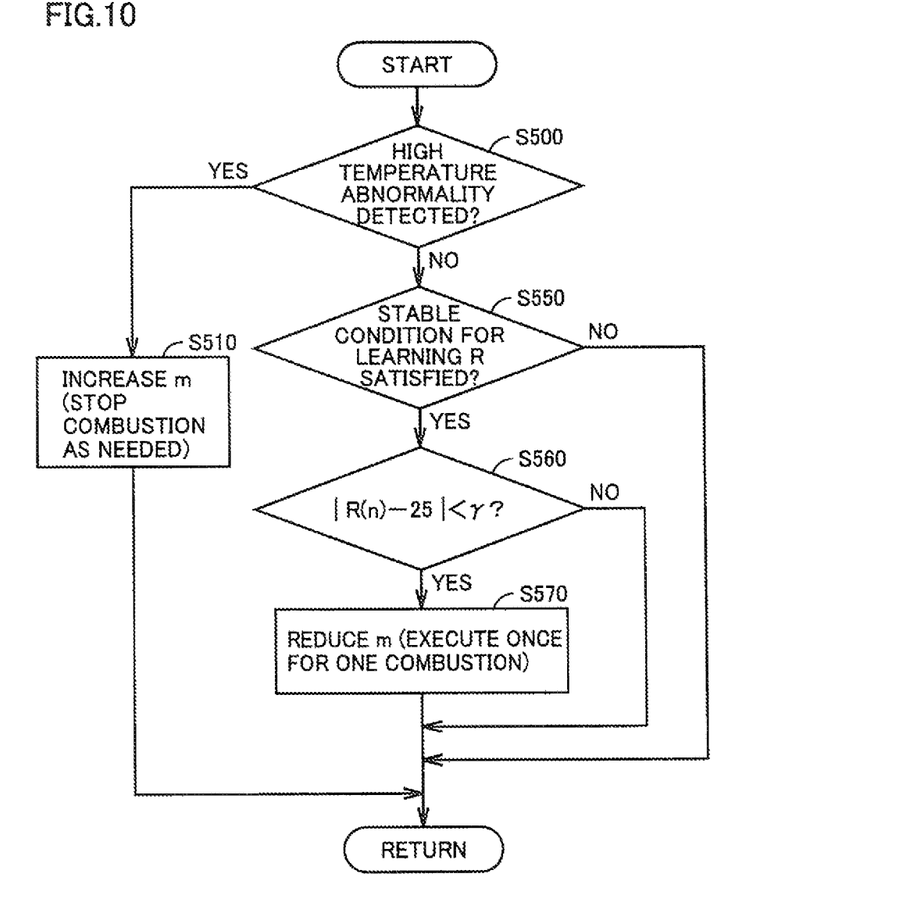
FIG. 10 is a flowchart for describing the processing of counting the number of high-temperature detection.

Next, the processing of counting the number "m" of high-temperature detection reflected in the initial temperature-raising control will be described with reference to FIG. 10. The control processing in accordance with the flowchart of FIG. 10 is repeatedly executed by control apparatus 200 in a predetermined cycle, so that the function of high temperature abnormality detecting unit 352 shown in FIG. 7 is achieved.

In step S500, control apparatus 200 compares tapping temperature Th with determination value (Tr+β) to detect high temperature abnormality. Specifically, determination of "YES" is made in S500 when Tr>(Tr+β), and determination of "NO" is made when not so.

At the time when high temperature abnormality is detected (determination of "YES" in S500), control apparatus 200 allows the processing to proceed to step S510 and increases the number "m" of high-temperature detection. In this stage, when the excessive temperature (Th−Tr) is too large, combustion in hot water supply apparatus 100 may be stopped as needed.

When the high temperature abnormality is not detected (determination of "NO" in S500), and the combustion state is stable, control apparatus 200 executes the processing of reducing the number "m" of high-temperature detection in accordance with the learning result of conversion factor R. Specifically, control apparatus 200 determines whether or not a condition for stability for the conversion factor learning is satisfied in step S550. For example, as described in the first embodiment, when the conversion factor learning is continued for a predetermined time period (for example, sixty seconds), and variation within a certain time period for both of input scale number Utl and the output heat quantity is less than or equal to a certain value (for example, the variation rate for ten seconds is within 3%), determination of "YES" is made in S550.

When the condition for stability of the conversion factor learning is satisfied (determination of "YES" in S550), control apparatus 200 allows the processing to proceed to step S560, and compares a difference (absolute value) between a present learning value R(n) of the conversion factor and the reference value of 25 with a determination value γ. When the learning value at the time of stable learning is close to 25, it is highly possible that there is no great deviation occurred between the input scale number to hot water supply apparatus 100 and the actual output heat quantity, and that no excessive gas supply to gas burner 130 as the main cause of the high temperature tapping occurs. When such a stable combustion state could be confirmed, it can be assumed that the possibility of occurrence of the high temperature abnormality is lowered.

Thus, when |R(n)−25|<γ (determination of "YES" in S560), control apparatus 200 allows the processing to proceed to step S570, and reduces the number "m" of high-temperature detection. The execution of step S570 is preferably limited to one time in one time combustion (between starting of combustion and termination of combustion).

On the other hand, when |R(n)−25|>γ (determination of "NO" in S560), control apparatus 200 skips step S570. Therefore, the number "m" of high-temperature detection is maintained.

With the processing of counting the number "m" of high-temperature detection shown in FIG. 10, determination is made on whether or not the combustion state is stabled based on the learning result of conversion factor R, so that the number "m" of high-temperature detection can be set appropriately in accordance with the possibility of occurrence of the high temperature abnormality.

Figure 11:
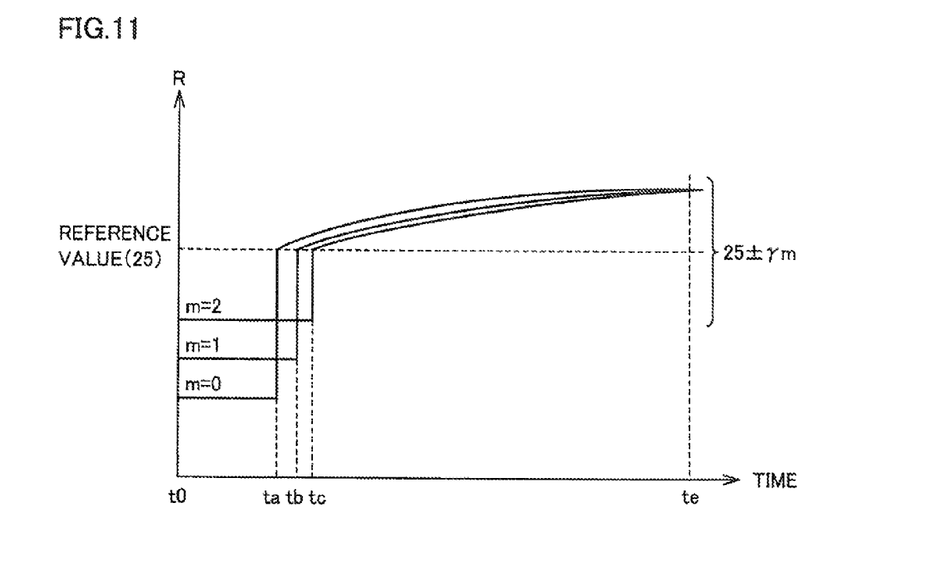
FIG. 11 represents a first example of a transition of the conversion factor in the hot water supply apparatus according to the present embodiment.
Figure 12:
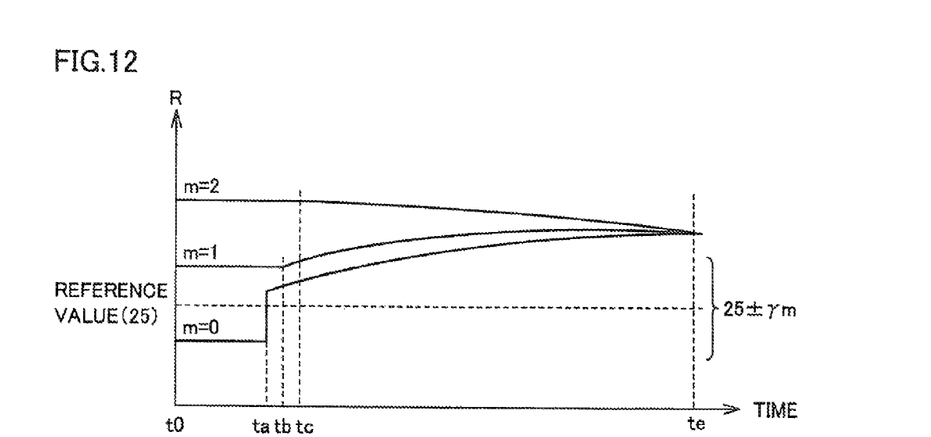
FIG. 12 represents a second example of the transition of the conversion factor in the hot water supply apparatus according to the present embodiment.

FIGS. 11 and 12 represent examples of the transition in the conversion factor under a certain flow rate in the hot water supply apparatus according to the present embodiment. FIG. 11 represents an example of transition in the region with high flow rate Q. On the other hand, FIG. 12 represents an example of transition in the region with low flow rate Q.

Referring to FIG. 11, in the example of m=0, the initial combustion period is between times t0 and ta. In the example of m=1, the initial combustion period is between times t0 and tb. In the example of m=2, the initial combustion period is between times t0 and tc.

In the initial combustion period, in any of m=0, 1, 2, conversion factor R is set in accordance with flow rate Q (certain value) and the number "m" of high-temperature detection. As shown in FIG. 8, conversion factor R is set so as to have a larger value, in other words, is set so as to lower the FF scale number as "m" becomes greater.

As shown in FIG. 8, in the region with high flow rate Q, conversion factor R is set to be small. Therefore, conversion factor R(L) at the termination of the initial combustion period (times ta, tb, tc) is smaller than 25. Thus, in step S420 in FIG. 9, initial value R(0) of the conversion factor is set to be equal to 25 in each of m=0, 1, 2. Subsequently, learning of conversion factor R is executed in accordance with a performance ratio of the input scale number and the output heat quantity in the hot water temperature control. At time "te", when the condition for stability of the conversion factor learning is satisfied in step S550, determination is made on whether or not the learning value is within the range of the reference value 25±γ. In the example of FIG. 11, since the learning value at time "te" is within the range of 25±γ, the number "m" of high-temperature detection is reduced by the processing in step S570 of FIG. 10.

Also in FIG. 12, similarly to FIG. 11, in the example of m=0, the initial combustion period is between times t0 and ta. In the example of m=1, the initial combustion period is between times t0 and tb. In the example of m=2, the initial combustion period is between times t0 and tc.

As shown in FIG. 8, in the region with low flow rate Q in the initial combustion period, conversion factor R is set to be relatively high. Therefore, in the example of m=0, conversion factor R<25 is provided. On the other hand, in the examples of m=1, 2, the conversion factor is set to be R>25 to prioritize prevention of occurrence of the high temperature abnormality.

Thus, learning initial value R(0) set at the time of termination of the initial combustion period (times ta, tb, tc) is set to be R(0)=25 in the example of m=0. On the other hand, in the examples of m=1, 2, the value of conversion factor R at the time of termination of the initial combustion period is set to be maintained.

Subsequently, learning of conversion factor R is executed in accordance with a performance ratio between the input scale number and output heat quantity in the hot water temperature control. Similarly to FIG. 11, at time "te", the condition for stability of the conversion factor learning in step S550 of FIG. 10 is satisfied. In the example of FIG. 12, since the learning value at time "te" is out of the range of 25±γ, step S570 of FIG. 10 is not executed. Therefore, the number "m" of high-temperature detection is not reduced.

Determination value γ for the number "m" of high-temperature detection may be set so as to be variable in accordance with the number "m" of high-temperature detection. For example, the value "γ" may be set greater as the number "m" of high-temperature detection is greater.

As described above, according to the second embodiment, the initial temperature-raising control for promptly raising the tapping temperature during the initial period from starting of combustion in hot water supply apparatus 100 can be applied to the control logic based on learning of the conversion factor described in the first embodiment.

Accordingly, through both of the initial combustion period and the steady combustion period (at the time of the conversion factor learning), the tapping temperature can be appropriately controlled without significantly changing the control logic.

In the hot water supply apparatus according to the present embodiment, gas burner 130 was illustrated as a "heat source mechanism" generating a heat quantity for heating water in hot water supply pipe 110. Description is made to confirm that application of the present invention is not limited to such a configuration. in other words, as long as it is configured such that the generated heat quantity is controllable in accordance with the requested heat quantity generation (input scale number) set by control apparatus 200, any "heat source mechanism" can be employed. For example, in place of the gas burner, any heat sources such as an oil burner combusting oil or a heat pump mechanism can be employed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A hot water supply apparatus comprising:
a heat exchanger configured to heat passing water by means of a heat quantity generated by a heat source mechanism;
a first temperature detector arranged on an upstream side of said heat exchanger;
a second temperature detector arranged on a downstream side of said heat exchanger;
a flow rate detector for detecting a passing flow rate through said heat exchanger; and
a control apparatus for setting a requested heat quantity generation to said heat source mechanism for each predetermined control cycle based on an inflow water temperature detected by said first temperature detector, a tapping temperature detected by said second temperature detector, a set temperature of said tapping temperature, and a flow rate detected by said flow rate detector,
said control apparatus including:
a learning unit for learning a conversion factor between a temperature and a heat quantity based on a performance ratio of an output heat quantity based on a temperature difference between said inflow water temperature and said tapping temperature and said flow rate with respect to said requested heat quantity generation to said heat source mechanism;
a feedforward control unit for calculating a first requested heat quantity generation based on a temperature difference between said set temperature and said inflow water temperature, said flow rate, and said conversion factor learned by said learning unit;
a feedback control unit for calculating a second requested heat quantity generation based on a temperature deviation of said tapping temperature with respect to said set temperature, said flow rate, a control gain, and said conversion factor learned by said learning unit; and
an addition unit for setting a requested heat quantity generation to said heat source mechanism by addition of said first requested heat quantity generation, and said second requested heat quantity generation.

2. The hot water supply apparatus according to claim 1, wherein said learning unit is configured to raise a learning speed of reflecting said performance ratio to a learning value of said conversion factor when said flow rate is high, and to lower the learning speed when said flow rate is low.

3. The hot water supply apparatus according to claim 1, wherein said control apparatus is configured to detect an abnormality of said hot water supply apparatus based on a value of said conversion factor learned by said learning unit.

4. The hot water supply apparatus according to claim 1, wherein said control apparatus further includes an initial setting unit for setting said conversion factor at least as a function of said flow rate during an initial combustion period from starting of combustion by means of said heat source mechanism to a timing at which a shortage temperature of said tapping temperature with respect to said set temperature becomes smaller than a predetermined threshold value, and
said learning unit does not execute the learning of said conversion factor during said initial combustion period.

5. The hot water supply apparatus according to claim 4, wherein said control apparatus is configured to set a learning initial value of said conversion factor by means of said learning unit in accordance with said conversion factor set by said initial setting unit at a time of termination of said initial combustion period.

6. The hot water supply apparatus according to claim 4, wherein said control apparatus further includes a high temperature abnormality detecting unit for detecting occurrence of a high temperature abnormality when an excessive temperature of said tapping temperature with respect to said set temperature becomes higher than a predetermined threshold value, and
said initial setting unit is configured to set said conversion factor further based on occurrence times of said high temperature abnormality detected by said high temperature abnormality detecting unit so that said requested heat quantity generation is lowered as said occurrence times become greater with respect to the same said flow rate.

7. The hot water supply apparatus according to claim 6, wherein said control apparatus is configured to reduce occurrence times of said high temperature abnormality based on a value of said conversion factor learned by said learning unit.

8. The hot water supply apparatus according to claim 1, wherein said feedback control unit has a proportional feedback unit for calculating said second requested heat quantity generation by dividing a product of said temperature deviation, a proportional control gain, and said flow rate by said conversion factor.

9. The hot water supply apparatus according to claim 8, wherein said learning unit is configured to raise a learning speed reflecting said performance ratio in a learning value of said conversion factor when said flow rate is high, and to lower the learning speed when said flow rate is low.

10. The hot water supply apparatus according to claim 8, wherein said control apparatus is configured to detect an abnormality of said hot water supply apparatus based on a value of said conversion factor learned by said learning unit.

11. The hot water supply apparatus according to claim 8, wherein said control apparatus further includes an initial setting unit for setting said conversion factor at least as a function of said flow rate during an initial combustion period from starting of combustion by means of said heat source mechanism to a timing at which a shortage temperature of said tapping temperature with respect to said set temperature becomes smaller than a predetermined threshold value, wherein
said learning unit does not execute the learning of said conversion factor during said initial combustion period.

12. The hot water supply apparatus according to claim 11, wherein said control apparatus is configured to set a learning initial value of said conversion factor by said learning unit in accordance with said conversion factor set by said initial setting unit at a time of termination of said initial combustion period.

13. The hot water supply apparatus according to claim 11, wherein said control apparatus further includes a high temperature abnormality detecting unit for detecting occurrence of a high temperature abnormality when an excessive temperature of said tapping temperature with respect to said set temperature becomes higher than a predetermined threshold value, and
said initial setting unit is configured to set said conversion factor further based on occurrence times of said high temperature abnormality detected by said high temperature abnormality detecting unit so that said requested heat quantity generation is lowered as said occurrence times become greater with respect to the same said flow rate.

14. The hot water supply apparatus according to claim 2, wherein said feedback control unit does not execute an integration feedback based on an integration value of said temperature deviation and an integral control gain.

15. The hot water supply apparatus according to claim 14, wherein said learning unit is configured to raise a learning speed of reflecting said performance ratio to a learning value of said conversion factor when said flow rate is high, and to lower the learning speed when said flow rate is low.

16. The hot water supply apparatus according to claim 14, wherein said control apparatus is configured to detect an abnormality of said hot water apparatus based on a value of said conversion factor learned by said learning unit.

17. The hot water supply apparatus according to claim 14, wherein said control apparatus further includes an initial setting unit for setting said conversion factor at least as a function of said flow rate during an initial combustion period from starting of combustion by means of said heat source mechanism to a timing at which a shortage temperature of said tapping temperature with respect to said set temperature becomes smaller than a predetermined threshold value, and
said learning unit does not execute the learning of said conversion factor during said initial combustion period.

18. The hot water supply apparatus according to claim 17, wherein said control apparatus is configured to set a learning initial value of said conversion factor by means of said learning unit in accordance with said conversion factor set by said initial setting unit at a time of termination of said initial combustion period.

19. The hot water supply apparatus according to claim 17, wherein said control apparatus further includes a high temperature abnormality detecting unit for detecting occurrence of a high temperature abnormality when an excessive temperature of said tapping temperature with respect to said set temperature becomes higher than a predetermined threshold value, and
said initial setting unit is configured to set said conversion factor further based on occurrence times of said high temperature abnormality detected by said high temperature abnormality detecting unit so that said requested heat quantity generation is lowered as said occurrence times become greater with respect to the same said flow rate.

20. A control method of a hot water supply apparatus provided with a heat exchanger configured to heat passing water by means of a heat quantity generated by a heat source mechanism, the method comprising the steps of:
detecting an inflow water temperature based on an output of a first temperature detector arranged on an upstream side of said heat exchanger;
detecting a tapping temperature based on an output of a second temperature detector arranged on a downstream side of said heat exchanger;
detecting a passing flow rate of said heat exchanger based on an output of a flow rate detector;
learning a conversion factor between a temperature and a heat quantity based on a performance ratio of an output heat quantity based on a temperature difference between said inflow water temperature and said tapping temperature and said flow rate with respect to requested heat quantity generation to said heat source mechanism;
calculating a first requested heat quantity generation by a feedforward control based on a temperature difference between a set temperature of said tapping temperature and said inflow water temperature, said passing flow rate, and said learned conversion factor;
calculating a second requested heat quantity generation by a feedback control based on a temperature deviation of said tapping temperature with respect to said set temperature, said passing flow rate, a control gain, and said learned conversion factor; and
setting said requested heat quantity generation by addition of said first requested heat quantity generation and said second requested heat quantity generation.

* * * * *